UNITED STATES PATENT OFFICE.

BERNHARD RICHARD, OF BASEL, SWITZERLAND, ASSIGNOR TO THE ANILINE COLOR AND EXTRACT WORKS, FORMERLY JOHN R. GEIGY, OF BASEL, SWITZERLAND.

AZO DYE AND PROCESS OF MAKING SAME.

993,549.    Specification of Letters Patent.    Patented May 30, 1911.

No Drawing. Application filed June 10, 1909, Serial No. 501,443. Renewed October 6, 1910. Serial No. 585,704.

*To all whom it may concern:*

Be it known that I, BERNHARD RICHARD, doctor of philosophy and chemist, a citizen of Germany, and a resident of Basel, Switzerland, have invented certain new and useful Improvements in Azo Dyestuffs and Processes of Making Same, whereof the following is a specification.

The invention relates to the manufacture of new ortho-oxy-disazo coloring matters of the type

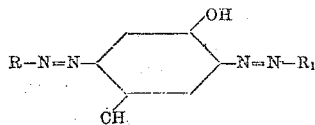

in which R represents the residue of an aromatic sulfonic or carboxylic acid or a derivative or substitution product, and $R_1$ represents the radical of an azo coloring matter component. These coloring matters, dyeing wool from acid bath after subsequent treatment with a chromate in different shades ranging from green to brown and black, are distinguished by an extreme fastness to the action of light and the processes of milling and potting. They are obtained by diazotizing para amino-metaoxy-azo coloring matters of the type

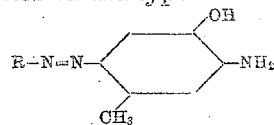

in which R represents the residue of an aromatic sulfonic or carboxylic acid, and combining the thus obtained diazo-azo compounds under suitable conditions with azo coloring matter components.

The para-amino-meta-oxy-azo coloring matters, which are the intermediate products for the manufacture of the ortho-oxy-disazo coloring matters can be obtained in the following way. If one tries to combine meta-amino-para-cresol

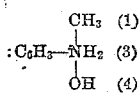

with an aromatic diazo-sulfonic acid in neutral or acid solution, the reaction takes place with a satisfying result only with stable and very easily coupling diazo bodies, such as diazochloro-anilin- and diazonitranilin sulfonic acids. With other diazo derivatives for example the diazosulfanilic or the diazo m-sulfanilic acid the combination takes place under ordinary conditions only in small part, while the greater part of the diazo sulfonic acid is decomposed with strong foaming. Then the interesting observation was made that this decomposition can be mostly avoided if the coupling is performed in the presence of the salts of certain thioacids. As particularly suitable for this purpose may be mentioned the thiosulfates, sulfocyanids and xanthogenates. Hereby it appears that more stable compounds of the diazo bodies are formed which in the gradual combination with the amino cresol are not so easily destroyed. Also the combination of the diazo-bodies, which couple satisfactorily without the addition of the above mentioned thiosalts, is accomplished more smoothly in the presence of the latter.

The following examples will serve to further illustrate the nature of this invention but the invention is not confined to these examples.

*A. Preparation of the new para-amino-meta-oxy-azo coloring matters.*

Example 1: 22 kilos of meta-nitranilin-para-sulfonic acid are transformed in the well known manner into the diazo compound which is isolated. The yellow diazo compound suspended in a little water is poured while stirring into a solution containing 16 kilos of hydrochlorid of meta-amino-para-cresol. The combination begins immediately and will be finished after several hours upon addition of 5 kilos of sodium acetate. The orange colored dyestuff is filtered off, pressed and can be further worked up in this form. The free sulfonic acid of the dyestuff dissolves in hot water with an orange yellow color; by addition of an alkali the color turns to blue red.

Example 2: The diazo compound produced from 173 kilos of sulfanilic acid is isolated, suspended in water and allowed to run into a solution containing 16 kilos of hydrochlorid of meta-amino-para-cresol to which had been added a solution of 25 kilos of sodium thiosulfate. The reaction commences at once and the mass takes a deep orange color. The coloring matter produced separates and is filtered off after about twelve hours and washed with water. The meta-amino-para-cresol in the filtrate which has not yet completely entered into combination can be made useful for the production of coloring matters by further addition of diazosulfanilic acid. The thus obtained dyestuff dissolves in water with an orange color which turns red by addition of an alkali. From an acid bath it dyes wool orange. On being treated with chromates the shade becomes more brown. If in place of the thiosulfate a salt of another of the mentioned thioacids is applied, the process is the same.

B. *Preparation of the ortho-oxy-disazo coloring matters.*

Example 1: 30.7 kilos of the coloring matter obtained by coupling diazosulfanilic acid with meta-amino-para-cresol are dissolved in water with 6 kilos of sodium carbonate and after addition of 7 kilos of sodium nitrite acidulated with hydrochloric acid. The diazotization, which can be accelerated by slight warming, is finished after a short time, and the brown yellow diazo compound is then isolated. It is suspended in a little water and the paste is introduced into a cooled concentrated solution of sodium beta-naphtholate containing 14.5 kilos beta naphthol to which is added 25 kilos of ammonia of 20 per cent. As the diazo compound dissolves with red color the dark colored bronze like product of reaction separates at the same time. The reaction is soon finished. The mass is diluted with water, warmed up, the coloring matter then precipitated by the addition of some common salt, filtered off, pressed and dried. It forms a bronzy shining black powder, soluble in water with a violet color turning bluish green by the addition of ammonia. In concentrated sulfuric acid it dissolves with a greenish color. In an acidulated bath wool is dyed claret; by aftertreating with bichromate it develops a bluish green color fast to light, milling and potting.

Example 2: The diazo compound produced according to Example 1 is added to a cooled solution of 14.5 kilos of alpha-naphthol in 70 kilos of caustic soda lye 36° Bé. The thick mass becomes blue black. is diluted with water after the reaction is complete and is neutralized with hydrochloric acid. The obtained coloring matter is isolated in the usual manner and carefully dried. It forms a bronze like dark powder which dissolves in concentrated sulfuric acid with a green color. Its aqueous solution is violet and turns to green blue with ammonia.

Example 3: The diazo compound obtained according to Example 1 is caused to run while stirring into a solution of 12.2 kilos of meta-toluylenediamin. The formation of the coloring matter takes place gradually and is accomplished after about twenty hours. The whole is warmed up, made alkaline with sodium carbonate and the precipitated coloring matter is filtered off, pressed and dried. It forms a black brown powder, which dissolves in concentrated sulfuric acid with a blue color. The aqueous claret colored solution becomes dull reddish violet by addition of ammonia. If in the place of the coloring matter made from sulfanilic acid and meta-amino-para cresol amino-oxy-azo compounds are employed, which contain instead of sulfanilic acid in the first place other sulfonic- or carboxylic-acids, the diazotization proceeds in exactly the same way. Further reaction is effected with the end components in the same manner.

In the following table a series of coloring matters produced after the described processes are listed together with the shades of their direct dyeings on wool as well as the shades of dyeings treated with bichromate:

| The acid combined with m-amino-p-cresol. | End group. | Shade on wool. | |
|---|---|---|---|
| | | Acid. | After treated with bichromate. |
| Sulfanilic acid... | Beta-naphthol... | Claret-colored | Blue green. |
| M-sulfanilic acid | Beta-naphthol... | Bluish claret colored. | Blue green. |
| Sulfanilic acid... | a-naphthol...... | Dull red violet. | Dull yellow green. |
| Sulfanilic acid... | Resorcin........ | Yellow red brown. | Gray black. |
| Sulfanilic acid... | 1-8-dioxynaphthalene-3-6-disulfonic acid. | Blue......... | Blue green. |
| Sulfanilic acid... | 2-5-amino-naphthol-7-sulfonic acid. | Red violet.... | Blue green. |
| Sulfanilic acid... | Meta-toluylenediamin. | Dark red brown. | Olive brown. |
| Meta-nitranilin para-sulfonic acid. | Beta-naphthol... | Dull red violet. | Blue green. |
| Ortho-chloranilin-m-sulfonic acid. | Beta-naphthol... | Dull red violet. | Blue green. |
| 1-naphthylamin 3-6-disulfonic acid. | Beta-naphthol... | Dull violet... | Olive green. |
| Para-amino-benzoic acid. | 2-7-naphthol-monosulfonic acid. | Claret colored. | Green. |
| Sulfanilic acid... | 2-7-dioxynaphthalene. | Claret colored. | Blackish green. |

Having now particularly described and ascertained the nature of my said invention and in what manner the same is to be performed, I declare that what I claim is—

1. The process of manufacturing oxy-disazo coloring matters, which process consists in first combining a diazotized aromatic amin, containing an acid radical, with m-amino-p-cresol in acid solution in the presence of a thiosalt, secondly rediazotizing the product obtained and finally coupling the diazo-oxyazo compound thus obtained with an azo coloring matter component.

2. The process of manufacturing oxydisazo coloring matters, which process consists in first combining a diazotized aromatic amin, containing an acid radical, with m-amino-p-cresol in acid solution in the presence of a thiosalt, secondly rediazotizing the product obtained and finally coupling the diazo-oxyazo compound with B-naphthol.

3. The process of manufacturing oxydisazo coloring matters, which process consists in first combining a diazotized aromatic amin, containing the group $SO_3H$, with m-amino-p-cresol in acid solution in the presence of a thiosalt, secondly rediazotizing the product obtained and finally coupling the diazo-oxyazo compound with B-naphthol.

4. As a new article of manufacture, the oxydisazo coloring matters having the general type

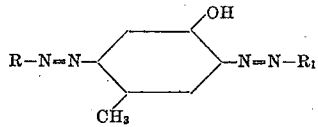

R representing the residue of an aromatic acid, $R_1$ representing the radical of an azo coloring matter component, said coloring matters dyeing wool after chromate treatment in shades ranging from green to brown and black, said dyed shades being fast to light, milling and potting.

5. As a new article of manufacture a coloring matter having the constitution

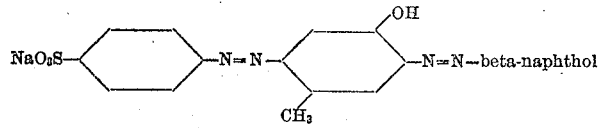

said coloring matter being a bronze-like shining blackish powder, soluble in water with a violet color, the solution turning bluish green by the addition of ammonia, said coloring matter being soluble in concentrated sulfuric acid with a greenish color, and dyeing wool a claret color in acidulated bath, said claret color changing by an after-treatment with bichromate to a bluish green color fast to light, potting and milling.

In testimony whereof I have signed this specification in the presence of two subscribing witnesses.

BERNHARD RICHARD.

Witnesses:
 GEORGE GIFFORD,
 ARNOLD ZUBER.